(12) United States Patent
Tagansky

(10) Patent No.: US 9,261,069 B2
(45) Date of Patent: Feb. 16, 2016

(54) SLOPING WALL CHANNEL

(76) Inventor: Elazar Tagansky, Tel Mond (IL)

( * ) Notice: Subject to any disclaimer, the term of this patent is extended or adjusted under 35 U.S.C. 154(b) by 0 days.

(21) Appl. No.: 14/127,191

(22) PCT Filed: Jun. 21, 2012

(86) PCT No.: PCT/IL2012/050213
§ 371 (c)(1),
(2), (4) Date: Dec. 18, 2013

(87) PCT Pub. No.: WO2012/176205
PCT Pub. Date: Dec. 27, 2012

(65) Prior Publication Data
US 2014/0110943 A1 Apr. 24, 2014

(30) Foreign Application Priority Data

Jun. 23, 2011 (IL) .......................................... 213751
Nov. 27, 2011 (IL) .......................................... 216638

(51) Int. Cl.
*F03B 13/10* (2006.01)
*F03B 13/12* (2006.01)
(Continued)

(52) U.S. Cl.
CPC . *F03B 13/22* (2013.01); *E02B 9/08* (2013.01);
*F03B 13/145* (2013.01); *F03B 13/147*
(2013.01); *F03B 13/182* (2013.01); *Y02E 10/38*
(2013.01)

(58) Field of Classification Search
CPC .......... F03B 13/08; F03B 13/14; F03B 13/22;
F03B 13/144; F03B 13/145; F03B 13/147;
Y02E 10/22; Y02E 10/28; Y02E 10/38
USPC ..................................................... 290/42, 52
See application file for complete search history.

(56) References Cited

U.S. PATENT DOCUMENTS

| 1,507,461 A | 9/1924 | Chase |
| 1,922,055 A | 8/1933 | Marx |

(Continued)

FOREIGN PATENT DOCUMENTS

| FR | 2878000 | 5/2006 |
| GB | 2 348 404 A | 4/2000 |

(Continued)

OTHER PUBLICATIONS

International Search Report mailed on Sep. 28, 2012 for International Application No. PCT/IL2012/050213.

*Primary Examiner* — Tulsidas C Patel
*Assistant Examiner* — Thomas Quigley
(74) *Attorney, Agent, or Firm* — Pearl Cohen Zedek Latzer Baratz LLP

(57) ABSTRACT

The invention relates to a device for collecting energy from water waves, comprising an extended length channel provided with a long shore-facing wall, a long sea-facing wall, and a remote end wall all extending substantially above high water level, and a proximate end wall forming a fixed lower dam having an upper edge approximately level with low water level. The shore-facing wall of the channel being sloped in a shoreward direction so that the upper open edge of the wall is nearer the shore than the lower edge of the wall. The sloped wall being impacted by waves having entered the channel and retaining water of the waves at a raised level above sea level. Inside the channel, the long sea-facing wall being pierced by multiple one-way apertures extending substantially over the complete area of the sea-facing wall, each one-way aperture being closed by an attached shutter unit opening inwards under pressure of incoming water waves and closing after the entry of the waves to maintain the raised water level in the channel.

8 Claims, 5 Drawing Sheets

(51) Int. Cl.
  *F03B 13/22* (2006.01)
  *E02B 9/08* (2006.01)
  *F03B 13/14* (2006.01)
  *F03B 13/18* (2006.01)

(56) References Cited

U.S. PATENT DOCUMENTS

| | | |
|---|---|---|
| 3,983,404 A | 9/1976 | Sherrard |
| 4,095,422 A | 6/1978 | Kurakake |
| 4,263,516 A | 4/1981 | Papadakis |
| 4,301,377 A | 11/1981 | Rydz |
| 4,332,506 A | 6/1982 | Andrews |
| 4,818,888 A | 4/1989 | Lenoir, III |
| 5,710,464 A | 1/1998 | Kao et al. |
| 5,888,020 A | 3/1999 | Brais et al. |
| 7,388,302 B1 | 6/2008 | Srybnik et al. |
| 7,619,320 B2 | 11/2009 | Omer |
| 2010/0034589 A1 | 2/2010 | Tagansky |

FOREIGN PATENT DOCUMENTS

| | | |
|---|---|---|
| IL | 180052 | 4/2011 |
| IL | 216638 | 2/2012 |
| IL | 213751 | 6/2012 |
| JP | 8177709 | 7/1996 |

SLOPING WALL CHANNEL

CROSS-REFERENCE TO RELATED APPLICATIONS

This application is a National Phase Application of PCT International Application No. PCT/IL2012/050213, International Filing Date Jun. 21, 2012, claiming the benefit of Israeli Patent Application No. 213751, filed Jun. 23, 2011, and of Israeli Patent Application No. 216638, filed Nov. 27, 2011, which are hereby incorporated by reference.

FIELD AND BACKGROUND OF THE INVENTION

The present invention relates to the utilization of water waves to generate renewable energy. More particularly, the invention provides an extended length channel arranged to trap incoming waves to raise the water level inside said channel and thereby to form an artificial river to drive a water wheel. A sloped wall of the channel protects same from the destructive force of water waves.

The present invention is an extension of and improvement on my registered Israel Patent 180052 titled "SYSTEM FOR GENERATING ENERGY FROM SEA WAVES" and two co-pending Israel Patent Applications: no. 213751 titled "POWER GENERATION USING A VARIABLE HEIGHT TURBINE' and no. 216638 titled "POWER GENERATION USING A VERTICAL SHAFT WATER WHEEL"

For the sake of simplicity the words "Water wheel" are used to describe the rotating member converting kinetic energy into rotational energy, the words being intended to include a unit which could be described as a water turbine.

The destructive power of water waves was tragically demonstrated in Fukushima, Japan in 2010 when following an earthquake a huge water wave entered two nuclear reactors destroying the essential equipment needed for cooling thereof. The result of this disaster was a world-wide reaction against nuclear power stations. While such events are indeed rare a normal storm raises waves that can batter and destroy a structure unless specially designed to withstand extreme stresses.

In my previous patents the channel has vertical walls and thus requires some reinforcement to remain serviceable under rough sea conditions.

OBJECTS OF THE INVENTION

It is therefore one of the objects of the present invention to obviate the disadvantages of prior art devices and to provide a wave energy device having improved resistance to wave forces.

It is a further object of the present invention to utilize some of the incoming wave energy for the generation of power in addition to the power being generated as the water passes through the water wheels.

SUMMARY OF THE INVENTION

The present invention achieves the above objects by providing a device for collecting energy from water waves, comprising an extended length channel provided with a long shore-facing wall, a long sea-facing wall, and a remote end wall all extending substantially above high water level, and a proximate end wall forming a fixed lower dam having an upper edge approximately level with low water level, said shore-facing wall of said channel being sloped in a shoreward direction so that the upper open edge of said wall is nearer the shore than the lower edge of said wall, said sloped wall being impacted by waves having entered said channel and retaining the water of said waves at a raised level above sea level, inside said channel, said long sea-facing wall being pierced by multiple one-way apertures extending substantially over the complete area of said sea-facing wall, each said one-way aperture being closed by an attached shutter unit opening inwards under pressure of incoming water waves and closing after the entry of said waves to maintain said raised water level in said channel;

and comprising at least one water wheel, arranged to be driven by water flowing outwards from inside said channel, said at least one water wheel being supported at a height so that the water held in said channel impacts at least part of the inner side of said water wheel while the outer side of said water wheel freely discharges water into air at a level above the water level on the outside of said channel.

PREFERRED EMBODIMENT OF THE INVENTION

In a preferred embodiment of the present invention there is provided a device further provided with an electric power generator connected to be driven by said at least one water wheel.

In a further preferred embodiment of the present invention there is provided a device further comprising a mechanically-driven water pump connected to be driven by said at least one water wheel.

In another preferred embodiment of the present invention there is provided a device further provided with at least one reciprocating energy collecting apparatus positioned inside said long channel.

In a further preferred embodiment of the present invention there is provided a device wherein said apparatus is provided with a plate member facing incoming waves and while absorbing energy therefrom being driven thereby in a first direction, said plate member being provided with means urging said plate member to return to its former position before being impacted by a successive incoming wave.

In a further preferred embodiment of the present invention there is provided a device wherein said water wheel comprises a plurality of stacked vertical-axis shaft water wheel sections, and wherein a first upper section may be fixed to drive a vertical-axis shaft, and a second, lower section and any further lower sections being mounted each on an overrunning clutch to drive said shaft in a first direction but being free to temporarily release said shaft when said shaft is driven faster than the speed of any lower section.

In a most preferred embodiment of the present invention there is provided device wherein a vertically movable upper dam and water wheel support is in sliding contact with said fixed lower dam and carries said at least one water wheel, said vertically movable upper dam and water wheel support preventing the exit of water from said channel over said lower dam while allowing water flow only through said at least one water wheel, the device being further provided with a float member operatively attached to said vertically movable upper dam and water wheel support, said float member automatically lifting and retaining said water wheel at the optimum height where the water held in said channel impacts at least part of the inner side of said water wheel while the outer side of said water wheel freely discharges water into air at a level above the water level on the outside of said channel.

Preferably there is further provided at least one counterweight operatively connected by tension members to said vertically movable upper dam and water wheel support, said at least one counterweight supporting most of the weight of said vertically movable upper dam and water wheel support including water wheel(s) carried thereby.

It will be realized that in a large structure such as the long channel in the present invention that substantial material savings may be realized on construction in an arrangement where the major stress applied to the structure has been reduced because the incoming waves are deflected instead of stopped. Furthermore a portion of the energy contained in the waves entering the channel can be collected and turned to useful instead of destructive purposes, as illustrated in FIG. 3.

SHORT DESCRIPTION OF THE DRAWINGS

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

FULL DESCRIPTION OF THE INVENTION

Figure 1:
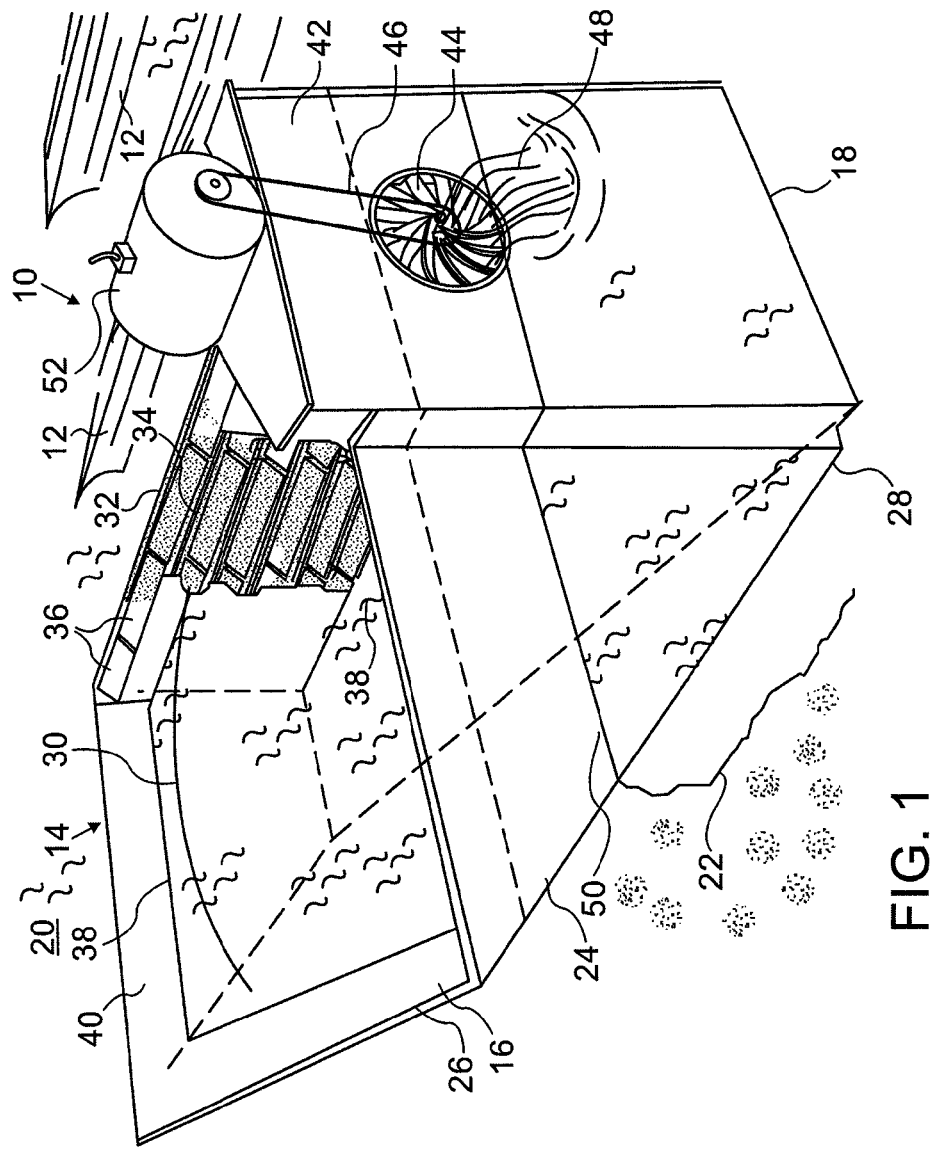
FIG. 1 is a perspective view of a preferred embodiment of the device according to the invention.

There is seen in FIG. 1 a device 10 for collecting energy from water waves 12.

An extended length channel 14 has an open top 16 and a closed bottom 18 and is seen partially immersed in a body of water 20 proximate to the shore 22.

The channel has a long shore-facing wall 24 which is sloped in a shoreward direction so that the upper open edge 26 of the wall 24 is nearer the shore 22 than the lower edge 28 thereof.

When in use the sloped wall 24 is impacted by waves 30 having entered the channel 14. The sloped wall 24 deflects the incoming waves 30 upwards thereby absorbing only a minor portion of the wave force. Thereafter the water falls back into the channel 14.

A long vertical sea-facing wall 32 is seen opposite the sloped wall 24. The sea-facing wall 32 is pierced by multiple one-way apertures 34 extending substantially over the complete area thereof. Each one-way aperture 34 is closed by a hinged shutter unit 36, the shutter 36 being opened inwards under pressure of incoming water waves 10, 30. The shutter 36 closes under pressure of water 38 in the channel 14 assisted by gravity, after the entry of the waves 30. Thus the shutters 36 maintain the raised water level 38 in the channel 14.

A remote end wall 40 is connected to both long walls 24, 32 and to the channel bottom 18 to seal the end of the channel 14.

A proximate end wall 42 is also connected to both long walls 24, 32 and to the channel bottom 18 to seal the near end of the channel 14.

A water wheel 44 is arranged to be driven by water 38 flowing outwards from inside the channel 14. The drawing shows a single water wheel but several water wheels may be assembled to the end wall 42. The water wheel 44 is supported at a height so that the water held in the channel impacts at least part of the inner side of the water wheel while the outer side of the water wheel 46 freely discharges water 48 into air at a level above the water level 50 on the outside of the channel 14.

All four walls 24, 32, 40, 42 of the channel 14 extend substantially above high water level, so that even at high tide water in the channel is retained at a level above sea level.

An electric power generator 52 is seen connected by a mechanical drive 54 by the water wheel 44.

With reference to the rest of the figures, similar reference numerals have been used to identify similar parts.

Figure 2:
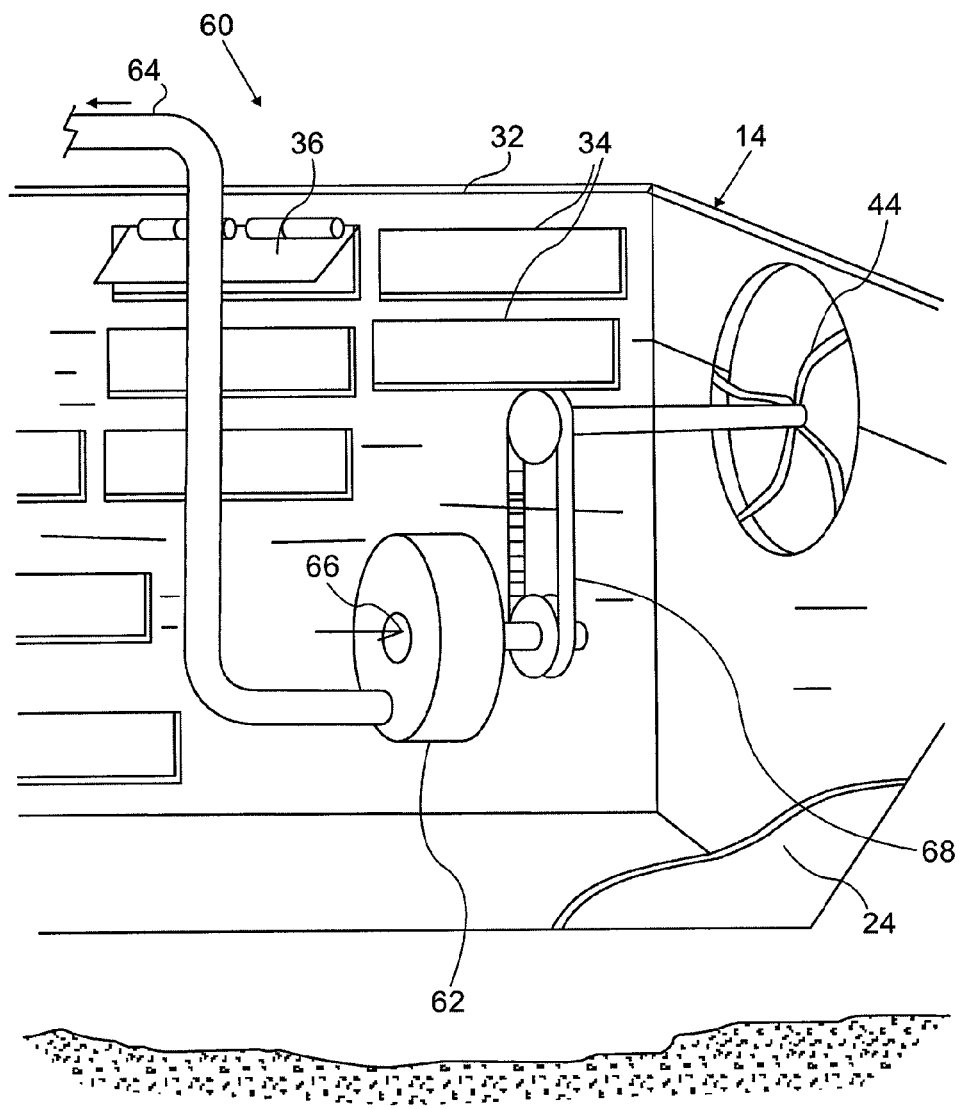
FIG. 2 is a perspective view of a detail of a device arranged for water pumping.

Referring now to FIG. 2, there is seen a detail of a device 60 having a channel 14 and a sloping wall 24 as was described with regard to FIG. 1. However instead of the electric generator 52 seen in FIG. 1, the device 60 further comprises a mechanically-driven water pump 62 having an outlet 64 and an underwater inlet 66. The water pump 62 has a mechanical drive 68 connecting the pump to the water wheel 44. No generator is needed. The efficiency losses of converting mechanical power into electricity by a generator and then reconverting electricity into mechanical power by means of an electric motor are thus avoided.

Exactly as was seen in FIG. 1, the sea-facing wall 32 is pierced by multiple one-way apertures 34 extending substantially over the complete area thereof. Each one-way aperture 34 is closed by a hinged shutter unit 36.

The present embodiment may be used, for example, to supply sea water to a desalination plant.

Figure 3:
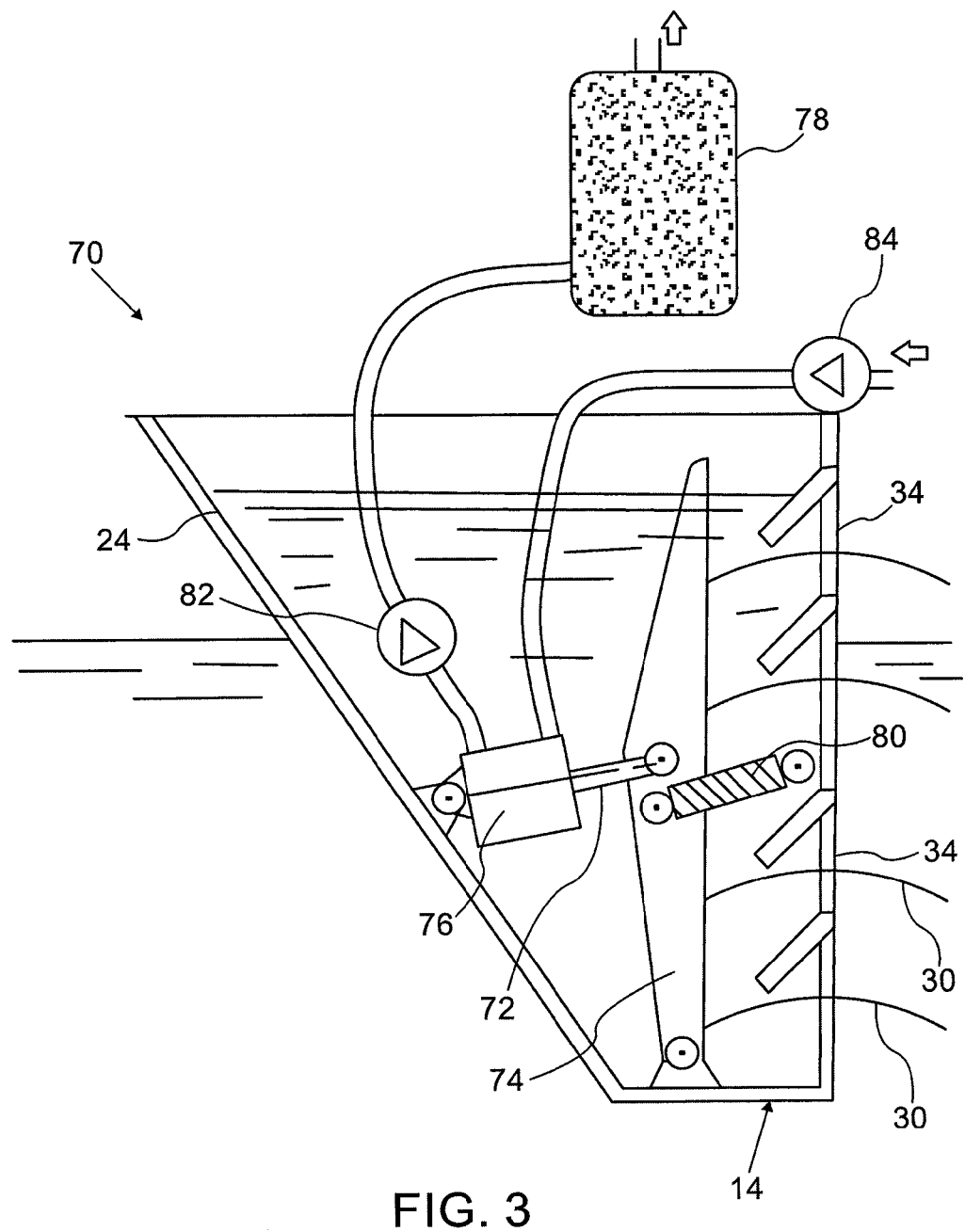
FIG. 3 is an end sectional view of an embodiment arranged to generate additional power from incoming waves.

FIG. 3 illustrates a detail of an embodiment 70, which is provided with a channel 14 and a waterwheel as described and seen in FIG. 1. The present embodiment is provided with an additional feature.

A reciprocating piston 72 acts as an energy collecting apparatus. A hinged plate member 74 is positioned inside the channel 14.

The hinged plate member 74 faces incoming waves 30 which have entered through the apertures 34. The incoming wave 30 impacts the hinged plate member 74, driving the piston 72 into a cylinder 76 containing a fluid. In the present example the fluid being compressed is a gas, typically air or a fuel gas. The fluid is then forced into an accumulator 78 from where compressed gas may be taken for use. After the wave 30 has completed its impact a spring member 80 urges the piston 72 and the plate member 74 to return to its original position before being impacted by a successive incoming wave 30.

Normally the long channel 14 is equipped with multiple apparatus 34.

One-way valves 82, 84 are used to maintain the desired direction of flow.

The apparatus 70 serves the double purpose of generating useful energy and as well as contributing to the protection of the sloping shore-facing wall 24 impacted by waves 30 which have already entered the channel 14.

The work done by the incoming waves can be converted into useful energy using other devices. For example the reciprocating energy of the hinged plate member can be converted into rotational energy by a crank mechanism.

The apparatus can also be used as an additional water pump.

In an embodiment not shown the fluid is a liquid such as water which is pumped to a high-level reservoir for release through a turbine when power is needed. In a further example the pumping energy is used further to raise the water level in the channel 14.

Figure 4:
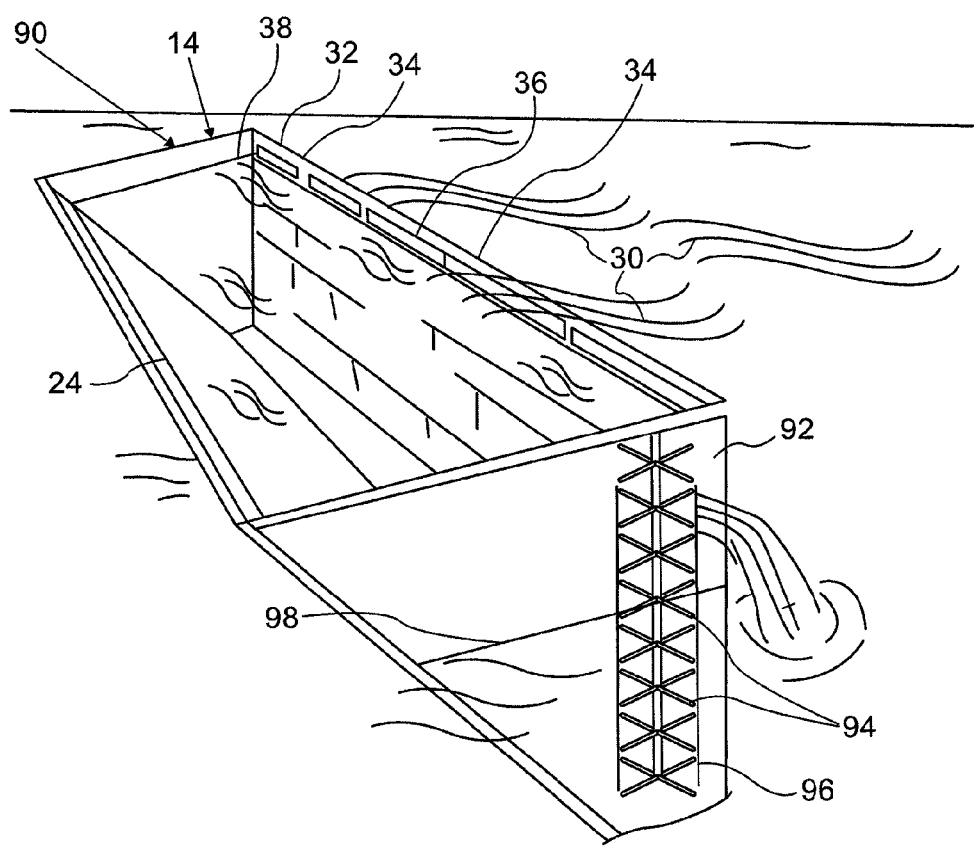
FIG. 4 is a perspective view of an embodiment wherein the water wheel is mounted on a vertical axis shaft.

Seen in FIG. 4 is an embodiment 90 of the device particularly suited to locations where there are large variations in water level 98, for example as between high and low tide or between Winter and Summer.

The device 90 is similar to device 10 seen in FIG. 1. However the water wheel comprises a plurality of stacked vertical-axis shaft water wheel sections 92, 94.

A first upper section 92 may be fixed to drive a vertical-axis shaft 96. The lower sections 94 are mounted each on an overrunning clutch, detailed in Israel Pat App 216638, to drive the shaft 96 in a first direction but are free to temporarily release the shaft when the shaft 96 is driven faster than the speed of any lower section 94.

Figure 5:
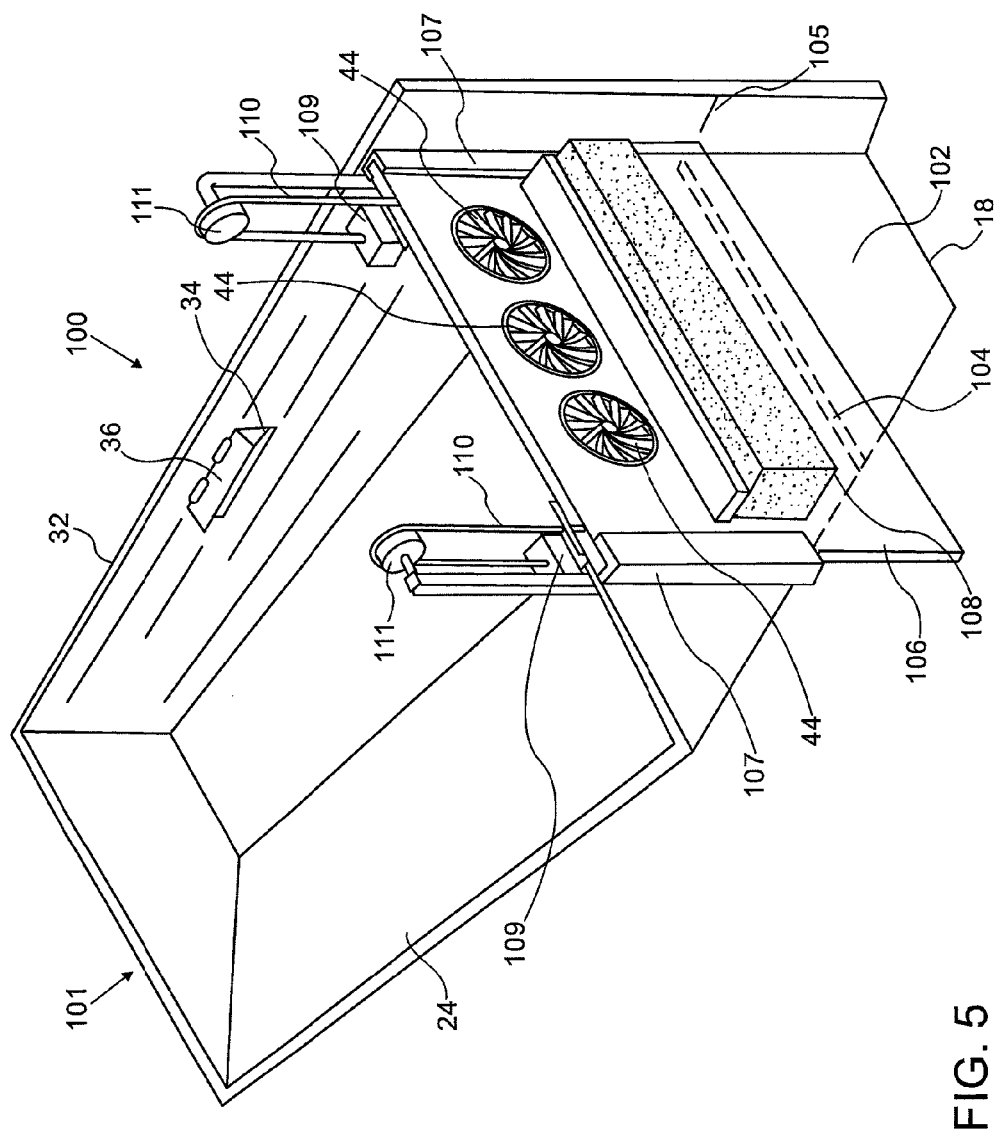
FIG. 5 is a perspective view of an embodiment wherein the water wheels are mounted on a vertically movable support plate.

Referring now to FIG. 5, there is depicted a device 100 specifically designed to cope with large height difference in the water level of the sea or lake between low and high tide, or between Winter and Summer.

In the long channel 101 the proximate end wall is composed of two plates 102, 103 acting as water dams which are in sliding contact with each other.

A fixed lower dam plate 102 has an upper edge 104 approximately level with low water level 105 outside the channel 101. The plate 102 is fixed to the shore-facing wall 24, to the floor plate 18 and to the sea-facing wall 32 carrying the multiple apertures 34 and shutter units 36 which have been described with reference to FIG. 1. In the embodiment shown 3 water wheels 44 are mounted on a movable support plate 106 acting as an upper dam. The support plate 106 is provided with guide members 107 to maintain sliding contact with the fixed lower dam plate 102, preventing the exit of water thereover. All water trapped in the channel 101 can exit only through the water wheels 44.

The movable support plate 106 is further provided with a float member 108 operatively attached thereto. The float member 108 is sized to automatically lift and retain the water wheels 44 at the optimum height. This height is defined as the height where the water held in the channel impacts at least part of the inner side of the water wheel while the outer side of said water wheel 44 freely discharges water into air at a level above the water level on the outside of the channel 101.

Advantageously as shown there are further provided two counterweights 109 operatively connected by cables 110 to the vertically-movable support plate 106. The counterweights 109 and cable pulleys 111 support most of the weight of the vertically movable support plate 106 including water wheels 44 carried thereon. The counterweights 109 serve to greatly reduce the required volume of the float member 108.

Construction of the device can be conveniently achieved by building the device on board a ship at dock. On completion of construction the device is floated in the sea and then tugged to its desired location near the shore.

The scope of the described invention is intended to include all embodiments coming within the meaning of the following claims. The foregoing examples illustrate useful forms of the invention, but are not to be considered as limiting its scope, as those skilled in the art will be aware that additional variants and modifications of the invention can readily be formulated without departing from the meaning of the following claims.

What is claimed is:

1. A device for collecting energy from water waves, comprising:
an extended length channel provided with a long shore-facing wall, a long sea-facing wall, and a remote end wall all extending substantially above high water level, and a proximate end wall comprising at least one water wheel and having a lower edge of the at least one water wheel approximately level with low water level, said shore-facing wall being sloped in a shoreward direction so that an upper open edge of said shore facing wall is closer to the shore than the lower edge of said shore facing wall, said sloped wall being impacted by waves having entered said channel and retaining the water of said waves at a raised level above low water level, inside said channel, said long sea-facing wall being pierced by a plurality of one-way apertures extending substantially over the complete area of said sea-facing wall, each said one-way aperture being closed by an attached shutter unit opening inwards under pressure of incoming water waves and closing after the entry of said waves into said channel to maintain said raised water level in said channel; and
wherein the at least one water wheel is driven by water leaving the channel by passing through the at least one water wheel.

2. The device as claimed in claim 1 further provided with an electric power generator connected to be driven by said at least one water wheel.

3. The device as claimed in claim 1 further comprising a mechanically-driven water pump connected to be driven by said at least one water wheel.

4. The device as claimed in claim 1 further provided with at least one reciprocating energy collecting apparatus positioned inside said long channel.

5. The device as claimed in claim 4 wherein said apparatus is provided with a plate member facing incoming waves and while absorbing energy therefrom being driven thereby in a first direction, said plate member being provided with means urging said plate member to return to its former position before being impacted by a successive incoming wave.

6. The device as claimed in claim 1, wherein said water wheel comprises a plurality of stacked vertical-axis shaft water wheel sections, and wherein a first upper section may be fixed to drive a vertical-axis shaft, and a second, lower section and any further lower sections being mounted each on an overrunning clutch to drive said shaft in a first direction but being free to temporarily release said shaft when said shaft is driven faster than the speed of any lower section.

7. The device as claimed in claim 1, wherein the proximate wall comprises: a vertically movable upper dam and water wheel support is in sliding contact with a fixed lower dam and carries said at least one water wheel, said vertically movable upper dam and water wheel support preventing the exit of water from said channel over said lower dam while allowing water flow only through said at least one water wheel, the device being further provided with a float member operatively attached to said vertically movable upper dam and water wheel support, said float member automatically lifting and retaining said water wheel at the optimum height where the water held in said channel impacts at least part of the inner side of said water wheel while the outer side of said water wheel freely discharges water into air at a level above the water level on the outside of said channel.

8. The device as claimed in claim 7 further provided with at least one counterweight operatively connected by tension members to said vertically movable upper dam and water wheel support, said at least one counterweight supporting most of the weight of said vertically movable upper dam and water wheel support including water wheel(s) carried thereby.

* * * * *